US009904947B2

(12) United States Patent
Smith

(10) Patent No.: US 9,904,947 B2
(45) Date of Patent: Feb. 27, 2018

(54) PROVIDING AN ENHANCED SHOPPING EXPERIENCE

(71) Applicant: TOSHIBA GLOBAL COMMERCE SOLUTIONS HOLDINGS CORPORATION, Tokyo (JP)

(72) Inventor: Jeffrey J. Smith, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 571 days.

(21) Appl. No.: 14/459,378

(22) Filed: Aug. 14, 2014

(65) Prior Publication Data

US 2014/0351086 A1 Nov. 27, 2014

Related U.S. Application Data

(63) Continuation of application No. 12/727,381, filed on Mar. 19, 2010, now abandoned.

(51) Int. Cl.
| | |
|---|---|
| *G06Q 30/00* | (2012.01) |
| *G06Q 30/06* | (2012.01) |
| *G06Q 30/02* | (2012.01) |
| *G06Q 50/26* | (2012.01) |
| *G07G 1/00* | (2006.01) |

(52) U.S. Cl.
CPC ..... *G06Q 30/0613* (2013.01); *G06Q 30/0281* (2013.01); *G06Q 30/06* (2013.01); *G06Q 30/0607* (2013.01); *G06Q 50/265* (2013.01); *G07G 1/0036* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 5,825,002 A | 10/1998 | Roalak | |
| 6,347,137 B1 | 2/2002 | Mason | |
| 6,497,362 B2 * | 12/2002 | Persky | G06Q 30/02 235/379 |
| 6,604,681 B1 | 8/2003 | Burke et al. | |
| 2003/0001007 A1 | 1/2003 | Lee et al. | |
| 2003/0195818 A1 | 10/2003 | Howell et al. | |
| 2004/0073489 A1 | 4/2004 | Varatharajah et al. | |
| 2004/0222302 A1 | 11/2004 | Matsumori | |
| 2005/0154646 A1 | 7/2005 | Chermesino | |
| 2007/0175988 A1 | 8/2007 | Martin | |

(Continued)

OTHER PUBLICATIONS

Yih et al.; "Pervasive Computing Technologies for Retail In-Store Shopping", Proceedings, International Conference on Pervasive Services, Jul. 2005, 6 pages, IEEE Xplore Digital Library, Piscataway, NJ, ISBN: 0 7803 90326.

(Continued)

*Primary Examiner* — Ethan D Civan
(74) *Attorney, Agent, or Firm* — H. Barrett Spraggins; Kennedy Lenart Spraggins LLP

(57) ABSTRACT

Methods, apparatus, and products are disclosed for enhancing a shopping experience that include: determining, by a self-checkout terminal, that a shopper invoked a help event; selecting, by the self-checkout terminal in dependence upon the help event, a shopper assistant to assist the shopper; and providing, by the self-checkout terminal to the shopper, distinguishing information identifying the shopper assistant.

20 Claims, 3 Drawing Sheets

(56) References Cited

U.S. PATENT DOCUMENTS

2008/0149710 A1    6/2008  Silverbrook et al.
2009/0119013 A1*  5/2009  O'Malley ......... G06F 17/30902
                                                      701/431

OTHER PUBLICATIONS

Office Action, U.S. Appl. No. 12/727,381, dated May 3, 2012, pp. 1-11.
Office Action, U.S. Appl. No. 12/727,381, dated Oct. 2, 2013, pp. 1-10.

* cited by examiner

Shopper Assistant Pool 312

Selected Shopper Assistant 314

Self-Checkout Terminal 316

PROVIDING AN ENHANCED SHOPPING EXPERIENCE

CROSS-REFERENCE TO RELATED APPLICATION

This application is a continuation application of and claims priority from U.S. patent application Ser. No. 12/727,381, filed on Mar. 19, 2010.

BACKGROUND OF THE INVENTION

Field of the Invention

The field of the invention is data processing, or, more specifically, methods, apparatus, and products for providing an enhanced shopping experience.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems and networks today that are much more ubiquitous and powerful than just a few years ago.

One of the most prevalent uses of these powerful computer systems and networks is for self-checkout terminals in retail establishments such as, for example, stores, restaurants, hotels, stadiums, and so on. Modern self-checkout systems may include one or more self-checkout terminals connected to a self-checkout terminal server that aggregates and administers self-checkout terminal transaction data. Each self-checkout terminal is typically located on a checkout counter and used by a shopper to complete customer sales. Each self-checkout terminal is a computing device that typically includes a check/debit card/credit card reader, bar code reader or radio frequency identification ('RFID') chip reader, and so on. The self-checkout terminals may communicate over a network to various external transaction systems such as, for example, credit card processing systems, debit card processing systems, check processing systems, and so on.

Shoppers using self-checkout terminals may require assistance from an employee of the retailer. Employees may be assigned to other tasks such as managing the entire front end of a store or checking out other customers and therefore the employees may not notice or otherwise be responsive to a customer in need of assistance. An unnoticed shopper waiting for assistance may not know who to ask for help and may leave without paying for items or go to an attended checkout station within the store.

SUMMARY OF THE INVENTION

Methods, apparatus, and products are disclosed for providing an enhanced shopping experience that include determining, by a self-checkout terminal, that a shopper invoked a help event; selecting, by the self-checkout terminal in dependence upon the help event, a shopper assistant to assist the shopper; and providing, by the self-checkout terminal to the shopper, distinguishing information identifying the shopper assistant.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
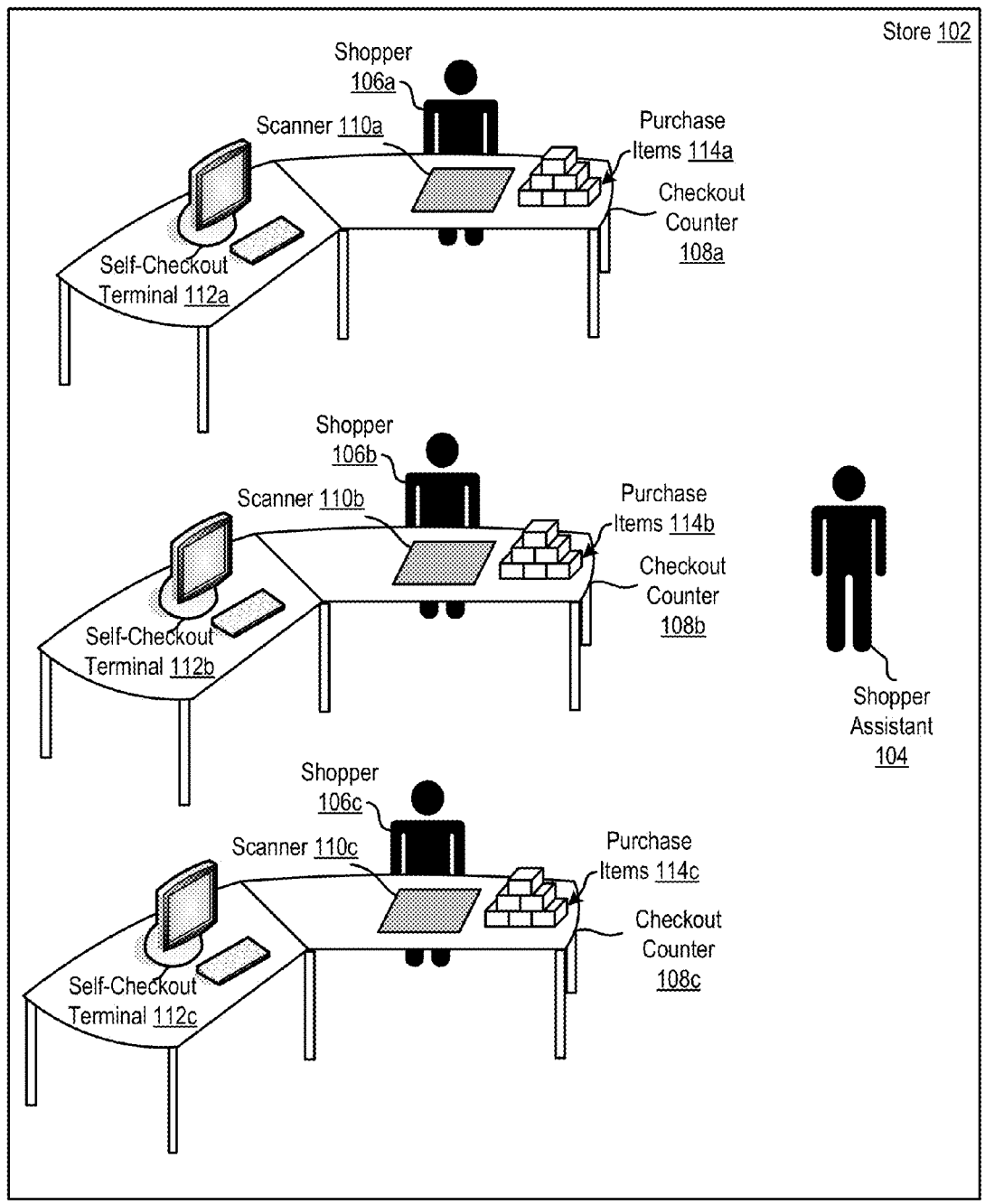
FIG. 1 sets forth an introductory diagram of a store that includes several self-checkout terminals useful in providing an enhanced shopping experience according to embodiments of the present invention.

Exemplary methods, apparatus, and products for providing an enhanced shopping experience in accordance with the present invention are described with reference to the accompanying drawings, beginning with FIG. 1. FIG. 1 sets forth a diagram of a store (102) that includes several self-checkout terminals (112a, 112b, 112c) useful in providing an enhanced shopping experience according to embodiments of the present invention.

The exemplary self-checkout terminals (112a, 112b, 112c) of FIG. 1 are computing devices used by shoppers (106a, 106b, 106c) to complete transactions at checkout counters (108a, 108b, 108c). The exemplary self-checkout terminals (112a, 112b, 112c) of FIG. 1 include user input devices such as, for example, a keyboard, a touch screen display, a microphone, and so on. The exemplary self-checkout terminals (112a, 112b, 112c) of FIG. 1 are coupled to scanners (110a, 110b, 110c) that are capable of identifying purchase items (114a, 114b, 114c) using a barcode, RFID tag, or any other technology as will occur to those of skill in the art. The scanners (110a, 110b, 110c) of FIG. 1 may be external scanners or internal scanners that are included as part of a self-checkout terminal (112a, 112b, 112c). An external scanner may be embodied, for example, as a hand held scanner coupled to the self-checkout terminal via a cable. An internal scanner may be embodied, for example, as a scanner that is included within the physical structure of a self-checkout terminal. Examples of self-checkout terminals (112a, 112b, 112c) that may be improved in accordance with the present invention include Toshiba's ST-7000 Modular POS Terminal, IBM's SurePOS™ 700 series of POS terminals, NCR's 7452-3500 POS terminal, and so on.

In the example of FIG. 1, the self-checkout terminals (112a, 112b, 112c) are configured to facilitate assistance from the shopper assistant (104) by determining that a shopper (106a, 106b, 106c) invoked a help event, selecting a shopper assistant (104) to assist the shopper (106a, 106b, 106c), and providing distinguishing information identifying the shopper assistant (104) to the shopper (106a, 106b, 106c). A help event is an event that is predetermined to be consistent with a shopper (106a, 106b, 106c) at a self-checkout terminal (112a, 112b, 112c) requiring or benefitting from assistance from a shopper assistant (104). In the example of FIG. 1, a help event may be initiated the shopper (106a, 106b, 106c) or by the self-checkout terminal (112a, 112b, 112c) itself. The shopper (106a, 106b, 106c) may initiate a help event when the shopper needs assistance from the shopper assistant (104), for example, by touching a particular area of a touch screen display at the self-checkout terminal (112a, 112b, 112c) to request help, by pressing a button at the self-checkout terminal (112a, 112b, 112c) to request help, and so on. In the example of FIG. 1, the self-checkout terminal (112a, 112b, 112c) may initiate a help event when the self-checkout terminal (112a, 112b, 112c) determines that some action has taken place at the self-checkout terminal (112a, 112b, 112c) that requires intervention from a shopper assistant (104) without requiring a specific request for assistance from the shopper (106a, 106b, 106c). For example, the self-checkout terminal (112a, 112b, 112c) may detect that the shopper (106a, 106b, 106c) has scanned a purchase item (114a, 114b, 114c) that is subject to age restrictions, such as alcohol or cigarettes.

The self-checkout terminals (112a, 112b, 112c) may determine that a shopper (106a, 106b, 106c) invoked a help event in a number of ways. For example, the self-checkout terminal (112a, 112b, 112c) may monitor user input interfaces, such as a touch screen display at the self-checkout terminal (112a, 112b, 112c) or a help button at the self-checkout terminal (112a, 112b, 112c), that are used by a shopper (106a, 106b, 106c) to request assistance. The self-checkout terminal (112a, 112b, 112c) may also determine that a shopper (106a, 106b, 106c) invoked a help event by monitoring for the occurrence of actions that require intervention from a shopper assistant (104) such as, for example, a shopper (106a, 106b, 106c) scanning a purchase item (114a, 114b, 114c) that is subject to age restrictions, a shopper (106a, 106b, 106c) failing to scan a purchase item (114a, 114b, 114c) for a predetermined period of time, and so on.

In the example of FIG. 1, the self-checkout terminals (112a, 112b, 112c) select a shopper assistant (104) to assist the shopper (106a, 106b, 106c) by selecting a particular shopper assistant (104) from a pool of available shopper assistants. Selecting a particular shopper assistant (104) may be carried out in a variety of ways, including selecting a shopper assistant (104) that has not assisted a shopper (106a, 106b, 106c) in the longest amount of time, selecting a shopper assistant (104) who has successfully resolved the highest percentage of help events, selecting the highest ranking shopper assistant (e.g., manager, assistant manager) (104), and so on as discussed in more detail with reference to FIG. 3.

In the example of FIG. 1, the self-checkout terminals (112a, 112b, 112c) provide distinguishing information identifying the shopper assistant (104) to the shopper (106a, 106b, 106c). Distinguishing information is information used by a shopper (106a, 106b, 106c) to identify a particular shopper assistant (104). Distinguishing information may include, for example, an image of the shopper assistant (104), a name of the shopper assistant (104), an employee badge number of the shopper assistant (104), and so on. In the example of FIG. 1, providing distinguishing information identifying the shopper assistant may be carried out by displaying the image of the selected shopper assistant (104) and the name of the selected shopper assistant (104) on a display at the self-checkout terminal (112a, 112b, 112c) as discussed in more detail with reference to FIG. 3.

Providing an enhanced shopping experience in accordance with the present invention is generally implemented with computers, that is, with automated computing machinery. In the store (102) of FIG. 1, for example, the self-checkout terminals (112a, 112b, 112c) are implemented to some extent with computers. For further explanation, therefore, FIG. 2 sets forth a block diagram of automated computing machinery comprising an exemplary self-checkout terminal (112) useful in providing an enhanced shopping experience according to embodiments of the present invention. The exemplary self-checkout terminal (112) of FIG. 2 includes at least one computer processor (156) or 'CPU' as well as random access memory (168) ('RAM') which is connected through a high speed memory bus (166) and bus adapter (158) to the processor (156) and to other components of the self-checkout terminal (112).

Stored in RAM (168) is a shopper assistant determination module (202), a module of computer program instructions for determining that a shopper invoked a help event, selecting a shopper assistant to assist the shopper, and providing distinguishing information identifying the shopper assistant. Also stored RAM (168) is a shopper assistant repository (204), a collection of files, records, or data structures that include distinguishing information identifying one or more shopper assistants. Each entry in the shopper assistant repository (204) includes a shopper assistant identifier (206) and a shopper assistant image (208). The shopper assistant identifier may be, for example, the name of the shopper assistant, an employee number for the shopper assistant, or any other information useful in identifying a particular shopper assistant. The shopper assistant image may be, for example, a picture of a particular shopper assistant or other visual representation of a particular shopper assistant. Entries in a shopper assistant repository (204) may be stored as entries in an array, a table, a database, a linked list, a binary tree, or other way as will occur to those of skill in the art. Although the shopper assistant determination module (202) and shopper assistant repository (204) are stored in RAM (168) in the example of FIG. 2, readers will recognize that the shopper assistant determination module (202) and shopper assistant repository (204) may be stored in any form of computer memory, including local computer memory or remotely accessible computer memory. The shopper assistant determination module (202) and shopper assistant repository (204) may also be implemented as computer program instructions, computer data stored in computer memory, special purpose hardware such as a field programmable gate array (FPGA), application-specific integrated circuit (ASIC), or any combination thereof.

Also stored in RAM (168) is an operating system (154). Operating systems useful providing an enhanced shopping experience according to embodiments of the present invention include UNIX™ Linux™ Microsoft XP™ AIX™ IBM's i5/OS™ and others as will occur to those of skill in the art. The operating system (154), shopper assistant determination module (202), and shopper assistant repository (204) in the example of FIG. 2 are shown in RAM (168), but many components of such software typically are stored in non-volatile memory also, such as, for example, on a disk drive (170).

Figure 2:
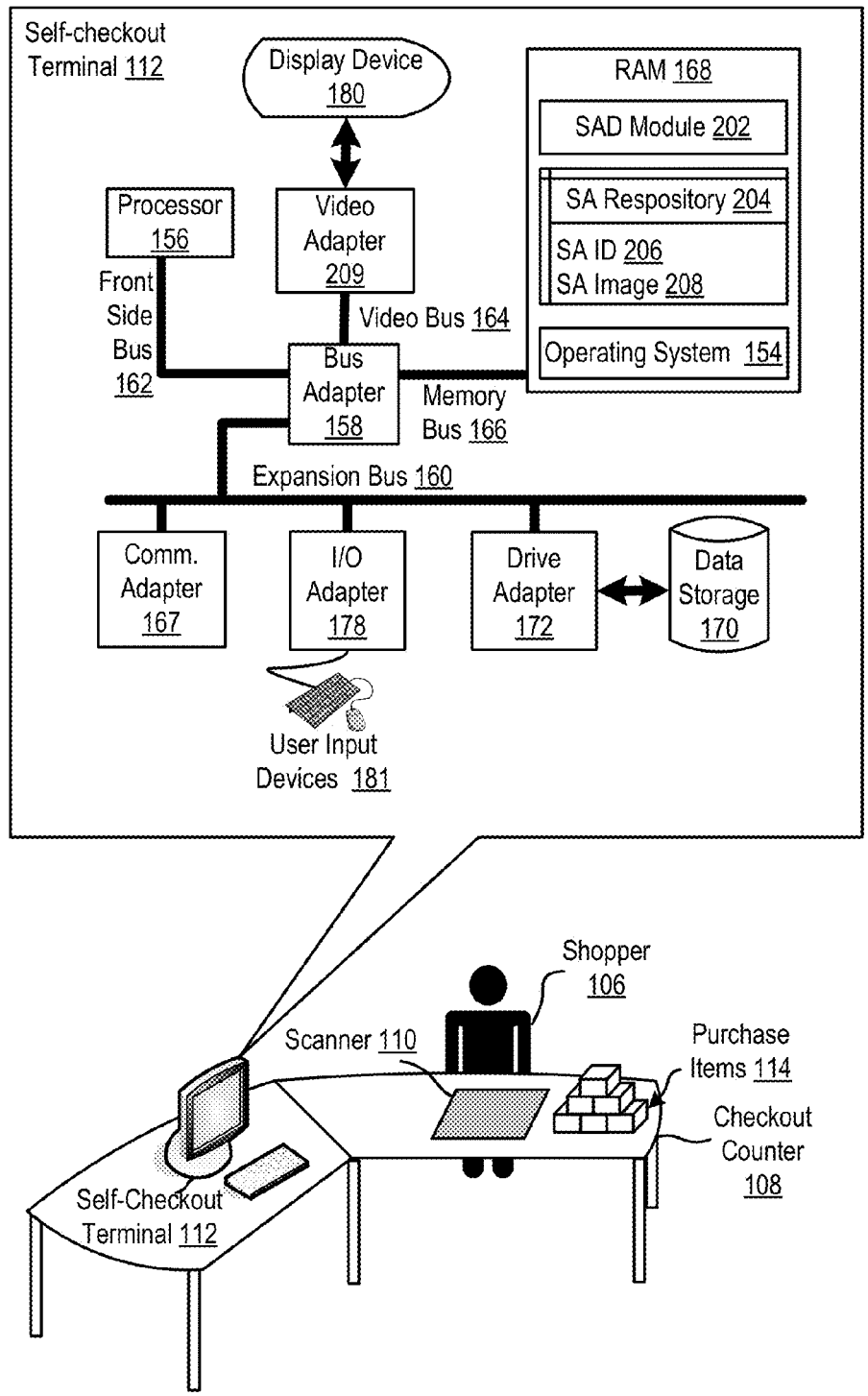
FIG. 2 sets forth a block diagram of automated computing machinery comprising an exemplary self-checkout terminal useful in providing an enhanced shopping experience according to embodiments of the present invention.

The exemplary self-checkout terminal (112) of FIG. 2 includes a disk drive adapter (172) coupled through an expansion bus (160) and a bus adapter (158) to a processor (156) and other components of the self-checkout terminal (112). The disk drive adapter (172) connects non-volatile data storage to the self-checkout terminal (112) in the form of disk drive (170). Disk drive adapters useful in self-checkout terminals for providing an enhanced shopping experience according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary self-checkout terminal (112) of FIG. 2 includes one or more input/output ('I/O') adapters (178). The I/O adapters implement user-oriented input/output through, for example, software drivers and computer hardware for controlling output to display devices such as computer display screens, as well as user input from user input devices (181) such as a keyboard, a mouse, a touch screen display, and so on. The exemplary self-checkout terminal (112) of FIG. 2 includes a video adapter (209), which is an example of an I/O adapter specially designed for graphic output to a display device (180) such as a display screen. The video adapter (209) is connected to the processor (156) through a high speed video bus (164), a bus adapter (158), and the front side bus (162), which is also a high speed bus.

In the example of FIG. 2, the self-checkout terminal (112) includes a communications adapter (167) for data communications with other computers, such as another self-checkout terminal, a shopper assistant station, mobile devices carried by a shopper assistant, and other communication devices that may communicate through a data communications network. Such data communications may be carried out serially through RS-232 connections, through external buses such as a Universal Serial Bus ('USB'), through data communications data communications networks such as IP data communications networks or telephony networks, and in other ways as will occur to those of skill in the art. Communications adapters implement the hardware level of data communications through which one computer sends data communications to another computer, directly or through a data communications network. Examples of communications adapters useful for providing an enhanced shopping experience according to embodiments of the present invention include modems for wired dial-up communications, Ethernet (IEEE 802.3) adapters for wired data communications network communications, and 802.11 adapters for wireless data communications network communications.

Figure 3:
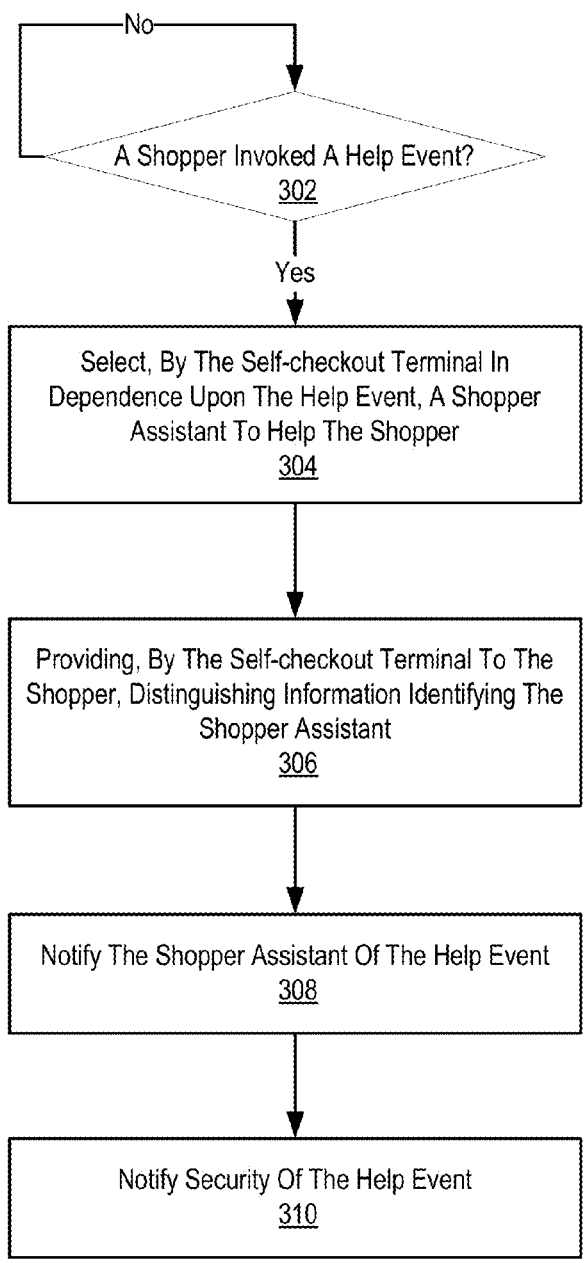
FIG. 3 a flow chart illustrating an exemplary method for providing an enhanced shopping experience according to embodiments of the present invention.
Figure 3:
Figure 3:
Figure 3:
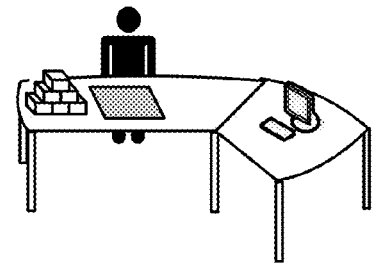

For further explanation, FIG. 3 sets forth a flow chart illustrating an exemplary method for providing an enhanced shopping experience according to embodiments of the present invention that includes determining (302), by a self-checkout terminal (316), that a shopper invoked a help event. A help event is an event that is predetermined to be consistent with a shopper at a self-checkout terminal (316) requiring or benefitting from assistance from a shopper assistant (314). In the example of FIG. 3, a help event may be an intervention event during a self-checkout session that is invoked by the self-checkout terminal (316). An intervention event is a help event that is predetermined to be consistent with the occurrence of some action taking place at the self-checkout terminal (316) that requires intervention from a shopper assistant (314) without requiring a specific request for assistance from the shopper. The self-checkout terminal (316) may invoke such a help event, for example, in response to determining that an item has not been scanned by a shopper for a predetermined period of time, in response to determining that a shopper has scanned an item that requires a shopper assistant (314) to verify the shopper's age, in response to determining that a shopper has placed an item in a bag without scanning the item and so on. A self-checkout terminal (316) may detect that a purchase item which has not been scanned has been placed into a checkout bag, for example, through the use of a scale at the self-checkout terminal (316). Checkout bags may be placed on the scale. When the scale measures multiple increases in the weight of the checkout bags since the last item was scanned, the self-checkout terminal (316) can determine that multiple items have been placed into the checkout bags since the last purchase item was scanned, meaning that a purchase item that has not been scanned has been placed into a checkout bag.

To invoke an intervention event the self-checkout terminal (316) may, for example, execute special purpose computer program instructions that are stored in memory of the self-checkout terminal (316) and configured to generate an appropriate help event. For example, the self-checkout terminal (316) may include computer program instructions to compare the bar code of a scanned item to a list of bar codes that represent items that may only be sold to shoppers older than a certain age. If the self-checkout terminal (316) determines that the scanned bar code is on such a list, the self-checkout terminal (316) may execute special purpose computer program instructions configured to generate an age verification help event. The age verification help event may be embodied, for example, as a special purpose data structure that includes an identifier of the self-checkout terminal (316) that generated the help event, and identifier of the purchase item subject to age restrictions, and the minimum age required to buy the purchase item. This special purpose data structure may subsequently be accessed and utilized by a notification module configured to generate a notification message that is sent to a selected shopper assistant (314).

In the example of FIG. 3, a help event may also include an assist request event during a self-checkout session invoked by the shopper. An assist request event is a help event invoked at the request of the shopper indicating that a shopper would like assistance from a shopper assistant (314). A shopper may invoke a help event, for example, by touching a particular area of a touch screen display at the self-checkout terminal (316) to request help, by pressing a button at the self-checkout terminal (316) to request help, and so on.

To invoke an assist request event the self-checkout terminal (316) may, for example, execute special purpose computer program instructions that are stored in memory of the self-checkout terminal (316). The special purpose computer program instructions may be configured to generate an appropriate help event. For example, the self-checkout terminal (316) may include computer program instructions to generate an assist request event when a region of a touch screen display corresponding to the location of a "help" button is touched by the user. The assist request event may be embodied, for example, in a special purpose data structure that includes an identifier of the self-checkout terminal (316) that generated the help event. This special purpose data structure may subsequently be accessed and utilized by a notification module configured to generate a notification message that is sent to a selected shopper assistant (314).

The example of FIG. 3 also includes selecting (304), by the self-checkout terminal (316) in dependence upon the help event, a shopper assistant (314) to assist the shopper. In the example of FIG. 3, selecting (304), by the self-checkout terminal (316) in dependence upon the help event, a shopper assistant (314) to assist the shopper may be carried out by selecting a particular shopper assistant (314) from a pool (312) of available shopper assistants. Selecting a particular shopper assistant (314) may be carried out in a variety of ways, including selecting a shopper assistant (314) that has not assisted a shopper in the longest amount of time, selecting a shopper assistant (314) who has successfully resolved the highest percentage of help events, selecting the highest ranking shopper assistant (e.g., manager, assistant manager) (314), and so on. Selecting a particular shopper assistant (314) may be carried out by executing special purpose computer program instructions that are stored in memory of the self-checkout terminal (316). The computer program instructions may implement shopper assistant selection rules that are configured to implement a particular shopper assistant selection policy, such as selecting a shopper assistant who has successfully resolved the highest percentage of requests for assistance. The computer program instructions may implement shopper assistant selection rules through the use of shopper assistant records stored in memory of the self-checkout terminal (316). Each shopper assistant record may include information identifying the most recent date and time that a particular shopper assistant was selected to assist a shopper, information identifying the percentage of help events that the shopper assistant has successfully resolved, and so on.

Selecting a particular shopper assistant (314) may also be carried out based on information included in the help event itself. For example, a user may be prompted by the self-checkout terminal (316) to specify the nature of a request for assistance, such as a request for a price check, a request for assistance due to malfunctioning hardware, a request for assistance to carry purchased items to the user's vehicle, and so on. In such an example, a shopper assistant (314) that has experience or training in responding to help events of the nature specified in the help event may be selected. A particular shopper assistant (314) may be included in the pool of available shopper assistants (312), for example, by scanning an employee badge at the self-checkout terminal (316), based on scheduling information that indicates which particular shopper assistants are expected to be working at a particular time and data, and so on.

The example of FIG. 3 also includes providing (306), by the self-checkout terminal (316) to the shopper, distinguishing information identifying the shopper assistant (314). Providing distinguishing information identifying the shopper assistant (314) may include, for example, displaying an image of the selected shopper assistant (314) on a display at the self-checkout terminal (316). Providing distinguishing information identifying the shopper assistant (314) may also include displaying an identifier of the shopper assistant (314), such as the shopper assistant's name, on a display at the self-checkout terminal (316). The distinguishing information may be used by the shopper to find a shopper assistant (314) to assist the shopper.

The example of FIG. 3 also includes notifying (308) the shopper assistant (314) of the help event. Notifying (308) the shopper assistant (314) of the help event may be carried out, for example, by sending a message to a mobile device carried by the shopper assistant (314), such as a Short Message Service (SMS) message, an electronic mail message, an audio recording delivered via a phone call to the mobile device, and so on. Notifying (308) the shopper assistant (314) of the help event may also be carried out by paging a shopper assistant (314) over an intercom system of the store, by sending a message to computer monitored by the shopper assistant (314), by illuminating a particular light at the self-checkout terminal (316), and in other ways as will occur to those of skill in the art.

The example of FIG. 3 also includes notifying (310) security of the help event. Notifying (310) security of the help event may be carried out, for example, by sending a message to a mobile device carried by security personnel, by paging a security personnel over an intercom system of the store, by sending a message to computer monitored by security personnel, by illuminating a particular light at the self-checkout terminal (316), and in other ways as will occur to those of skill in the art.

Exemplary embodiments of the present invention are described largely in the context of a fully functional self-checkout terminal for providing an enhanced shopping experience. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any self-checkout terminal having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a self-checkout terminal, partly on the self-checkout terminal, as a stand-alone software package, partly on the self-checkout terminal and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing an enhanced shopping experience, the method comprising:
   determining, by a shopper assistant determination module in a self-checkout terminal, that a shopper invoked a help event, the help event generated in response to the shopper scanning an item that requires verification of the shopper's age;
   selecting, by the shopper assistant determination module in the self-checkout terminal in dependence upon the help event, a shopper assistant to assist the shopper, wherein the shopper assistant determination module searches shopper assistant records to select the shopper assistant who has successfully resolved a highest percentage of help events; and
   providing, by the shopper assistant determination module in the self-checkout terminal to the shopper, distinguishing information identifying the shopper assistant, thereby providing an enhanced shopping experience by facilitating assistance for the shopper in need of assistance.

2. The method of claim 1 wherein the help event further comprises an intervention event during a self-checkout session invoked by the self-checkout terminal.

3. The method of claim 1 wherein the help event further comprises an assist request event during a self-checkout session invoked by the shopper.

4. The method of claim 1, wherein providing, by the self-checkout terminal to the shopper, distinguishing information identifying the shopper assistant further comprises displaying, on a display at the self-checkout terminal, an image of the shopper assistant.

5. The method of claim 1, wherein providing, by the self-checkout terminal to the shopper, distinguishing information identifying the shopper assistant further comprises displaying, on a display at the self-checkout terminal, an identifier of the shopper assistant.

6. The method of claim 1 further comprising notifying the shopper assistant of the help event.

7. The method of claim 1 further comprising notifying security of the help event.

8. A self-checkout terminal for providing an enhanced shopping experience, the apparatus comprising a computer processor, a computer memory operatively coupled to the computer processor, the computer memory having disposed within it computer program instructions for:
 determining, by a shopper assistant determination module in a self-checkout terminal, that a shopper invoked a help event, the help event generated in response to the shopper scanning an item that requires verification of the shopper's age;
 selecting, by the shopper assistant determination module in the self-checkout terminal in dependence upon the help event, a shopper assistant to assist the shopper, wherein the shopper assistant determination module searches shopper assistant records to select the shopper assistant who has successfully resolved a highest percentage of help events; and
 providing, by the shopper assistant determination module in the self-checkout terminal to the shopper, distinguishing information identifying the shopper assistant, thereby providing an enhanced shopping experience by facilitating assistance for the shopper in need of assistance.

9. The self-checkout terminal of claim 8 wherein the help event further comprises an intervention event during a self-checkout session invoked by the self-checkout terminal.

10. The self-checkout terminal of claim 8 wherein the help event further comprises an assist request event during a self-checkout session invoked by the shopper.

11. The self-checkout terminal of claim 8 wherein providing, by the self-checkout terminal to the shopper, distinguishing information identifying the shopper assistant further comprises displaying, on a display at the self-checkout terminal, an image of the shopper assistant.

12. The self-checkout terminal of claim 8, wherein providing, by the self-checkout terminal to the shopper, distinguishing information identifying the shopper assistant further comprises displaying, on a display at the self-checkout terminal, an identifier of the shopper assistant.

13. The self-checkout terminal of claim 8, further comprising computer program instructions for notifying the shopper assistant of the help event.

14. The self-checkout terminal of claim 8, further comprising computer program instructions for notifying security of the help event.

15. A computer program product for providing an enhanced shopping experience, the computer program product disposed upon a computer readable storage medium, the computer program product comprising computer program instructions that, when executed, cause a computer to carry out the steps of:
 determining, by a shopper assistant determination module in a self-checkout terminal, that a shopper invoked a help event, the help event generated in response to the shopper scanning an item that requires verification of the shopper's age;
 selecting, by the shopper assistant determination module in the self-checkout terminal in dependence upon the help event, a shopper assistant to assist the shopper, wherein the shopper assistant determination module searches shopper assistant records to select the shopper assistant who has successfully resolved a highest percentage of help events; and
 providing, by the shopper assistant determination module in the self-checkout terminal to the shopper, distinguishing information identifying the shopper assistant, thereby providing an enhanced shopping experience by facilitating assistance for the shopper in need of assistance.

16. The computer program product of claim 15 wherein the help event further comprises an intervention event during a self-checkout session invoked by the self-checkout terminal.

17. The computer program product of claim 15 wherein the help event further comprises an assist request event during a self-checkout session invoked by the shopper.

18. The computer program product of claim 15 wherein providing, by the self-checkout terminal to the shopper, distinguishing information identifying the shopper assistant further comprises displaying, on a display at the self-checkout terminal, an image of the shopper assistant and an identifier of the shopper assistant.

19. The computer program product of claim 15 further comprising computer program instructions that, when executed, cause a computer to carry out the step of notifying the shopper assistant of the help event.

20. The computer program product of claim 15 further comprising computer program instructions that, when executed, cause a computer to carry out the step of notifying security of the help event.

\* \* \* \* \*